United States Patent [19]
Venkatraman et al.

[11] Patent Number: 6,083,313
[45] Date of Patent: Jul. 4, 2000

[54] HARDCOATS FOR FLAT PANEL DISPLAY SUBSTRATES

[75] Inventors: Chandra Venkatraman, Williamsville; Cyndi Brodbeck, South Wales, both of N.Y.

[73] Assignee: Advanced Refractory Technologies, Inc., Buffalo, N.Y.

[21] Appl. No.: 09/361,006

[22] Filed: Jul. 27, 1999

[51] Int. Cl.$^7$ ........................ C09D 201/06; C09D 201/10
[52] U.S. Cl. .................... 106/287.14; 428/412; 428/446; 428/447
[58] Field of Search ................ 106/287.14; 428/412, 428/446, 447

[56] References Cited

U.S. PATENT DOCUMENTS 5,041,303  8/1991  Wertheimer et al. ...................... 427/39
5,314,724  5/1994  Tsukune et al. ......................... 427/489
5,424,131  6/1995  Wertheimer et al. .................... 428/413
5,508,368  4/1996  Knapp et al. ............................ 427/534

*Primary Examiner*—David Brunsman
*Attorney, Agent, or Firm*—Kellie M. Ulrich, Esq.

[57] ABSTRACT

The present invention relates to a unique hard coating that provides the necessary characteristics for flat panel display plastic substrates because the coating is amorphous and is comprised of C, H, Si and O. The coating of the present invention is hard, optically transparent, scratch and abrasion resistant and hydrophobic. It is deposited by a low density, low temperature plasma enhanced chemical vapor deposition (PECVD) process and exhibits excellent barrier protection and reduced permeability to moisture, oxygen, helium and other vapors.

17 Claims, 3 Drawing Sheets

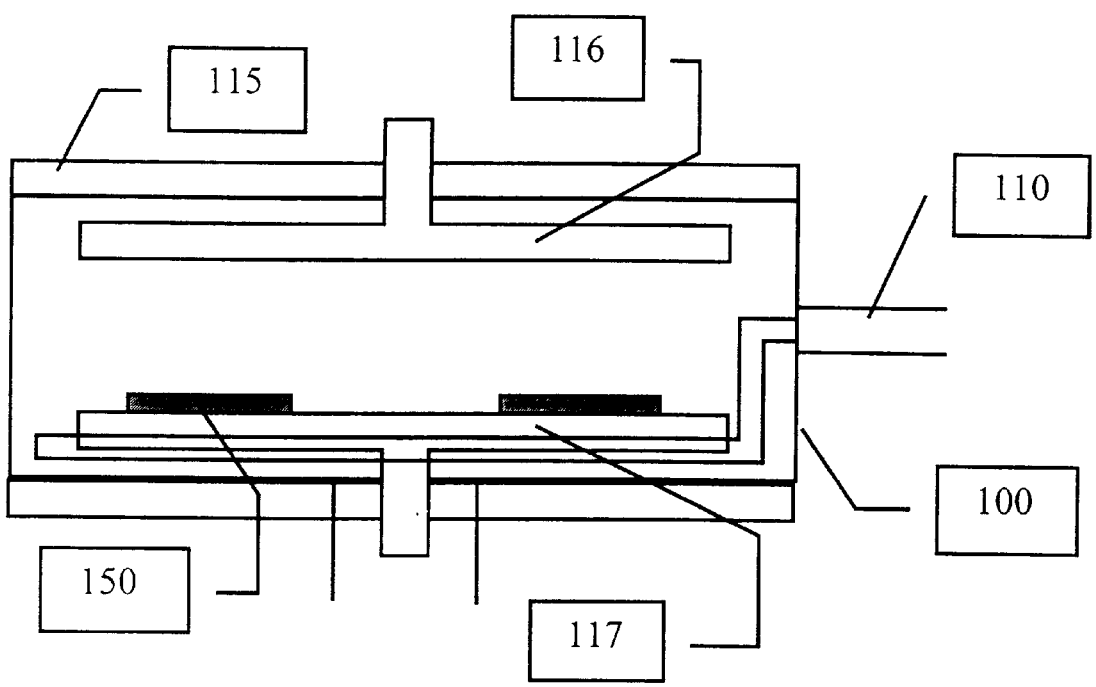
Figure 1: Schematic of a hardcoating deposition chamber.

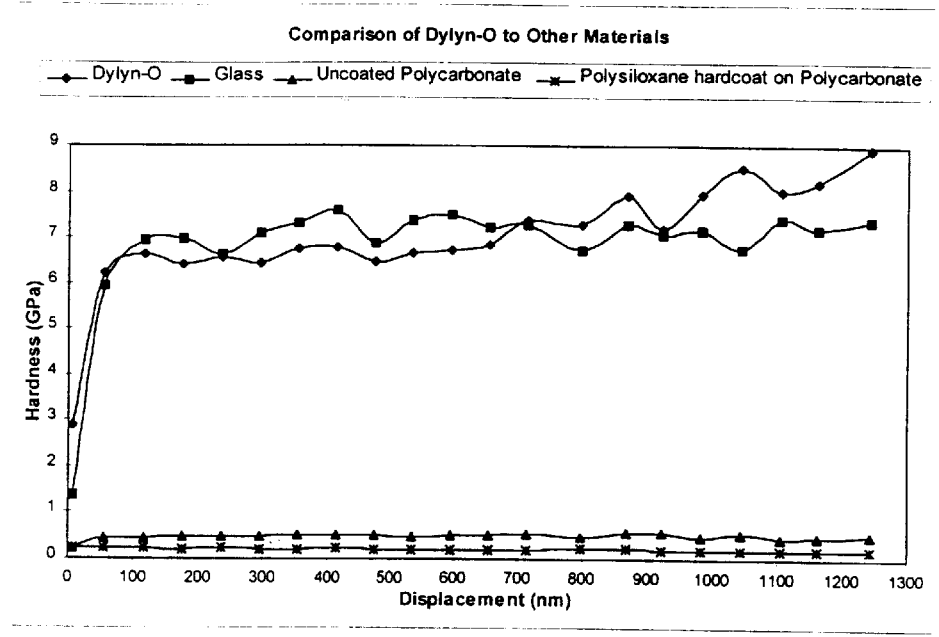
Figure 2: Comparison of Hardness of the coating with uncoated polycarbonate, bare glass and polysiloxane dip coated polycarbonate.

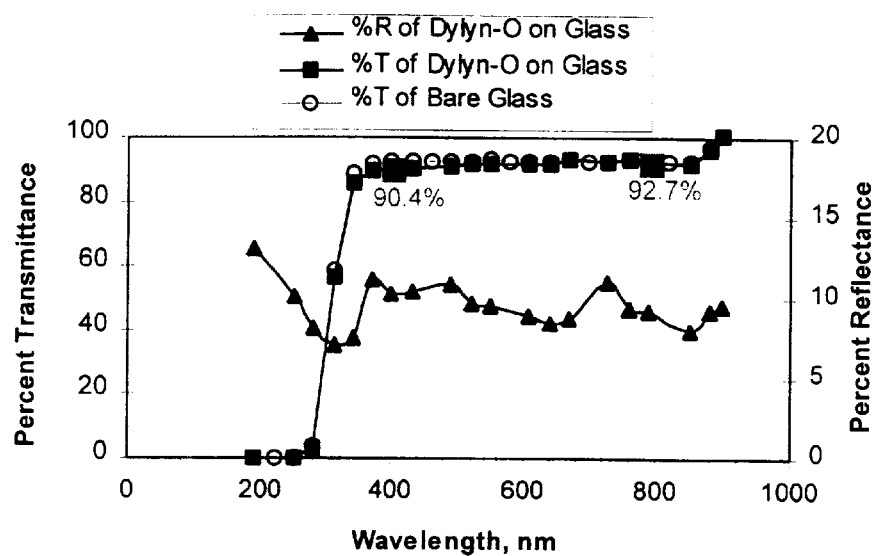
Figure 3: Typical UV-Vis transmission and reflectance spectra for a coating on glass.

HARDCOATS FOR FLAT PANEL DISPLAY SUBSTRATES

FIELD OF THE INVENTION

The present invention relates generally to transparent hard coatings on plastic substrates for flat panel displays. More particularly, the present invention relates to a coating comprised of carbon, hydrogen, silicon and oxygen.

BACKGROUND OF THE INVENTION

Flat Panel Displays (FPDs) have a wide range of consumer, industrial and military applications and are projected to exceed $20 billion dollars by the year 2000. Of the many types of FPD technologies, Liquid Crystal Display (LCD) technology leads the pack and is most mature. The profit margins in the LCD market are becoming increasingly low, because of the changing market. There is an increased push to reduce the material cost in making FPDs which is estimated to be about 40 to 50% of the total display cost. There is a thrust towards looking at new materials, decreasing weight, reducing display thickness, improving viewing angles and lowering back illumination.

One of the key challenges to making the next generation, low weight FPDs is replacement of glass displays with plastic displays. Plastic displays are lower weight, shatter resistant and can provide equivalent transmission properties to that of glass. However, plastics such as polycarbonates and polyethylene terephthalates (PET) are not scratch and abrasion resistant. It is important to provide a hard coating to the plastic with good transmission and refractive index matching to effectively function as flat panel displays. Another disadvantage of plastics is they are permeable to liquids and vapors, which is undesirable. Permeation of water vapor, oxygen, liquid crystals and other gases could ruin the electronics behind the flat panel display, if proper barrier protection is not provided. Thus the hard coating also needs to be impermeable to liquids, vapors and solvents used in the FPD manufacturing.

The markets for plastic substrate FPDs is quite huge, prominent being the LCD market. Plastic substrate displays could be used in LCD applications, which currently use soda-lime glass displays. This is a sizable portion of the display market and can be as high as 5 billion square inches by year 2000. The LCD applications, where hardcoated plastic displays could be used, include consumer applications such as clocks, watches, calculators, games, personal digital assistants (PDAs), phones, televisions, camcorders, cameras and industrial applications include PCs, medical inuments, facsimiles, thermostat meters, industrial displays, test equipment etc.

There are a number of hardcoats that are available in the industry. The predominant coatings which might be considered as hardcoats are DLC and polysiloxane dip coatings. Conventional DLC coatings consist of carbon and hydrogen with no silicon and oxygen. Polysiloxane coatings are deposited by spin coating, spraying or dipping followed by a curing step or UV hardening.

Dip coatings, are wet chemical processes which require significant handling and several hours to go through the coating process. Also, the chemicals used are partially toxic and combustible, making them increasingly difficult to handle due to environmental considerations. The present invention has the potential of depositing coatings at high deposition rates, which is cost-effective, requires minimum handling and is benign to the environment.

The present invention is a low temperature process capable of depositing on heat sensitive plastics such as polycarbonates and polyethylene terephthalates. The substrate temperature does not exceed 70° C. during normal operation. However, active cooling of the substrate temperature is possible and the substrate temperature can be maintained at room temperature. Because the present invention involves a low temperature process, there is no thermal mismatch issue between the substrate and the hard coating. DLC processes typically require higher temperatures (as high as 200° C.) and hence adapting the DLC technology to coating low temperature materials is a significant problem. The present invention can be deposited on substrate materials as thin as 0.075 mm while some dip coating polysiloxane processes require rigid substrates (minimum thickness~1 mm).

DLC coatings exhibit high compressive stresses (sometimes 5 times that of the present invention) resulting in poor adhesion to substrates. The poor adhesion of DLC necessitates the use of interlayers to improve adhesion, which is not required in the present invention.

The present invention yields an extremely hard coating compared to polysiloxane dip coatings. The polysiloxane hard coatings are not as abrasion resistant as glass. DLC coatings are harder than the present invention, but because of their increased hardness they exhibit high internal stress and hence require interlayers to promote adhesion.

Petrmichl et al (U.S Pat. No. 5,618,619) discusses an abrasion resistant coating deposited using an ion-assisted process with nanoindentation hardness of 2 to about 5 GPa. The coatings of Petrmichl et al are softer than the present invention and their effectiveness as a barrier coating is unknown. Also the invention of Petrmichl et al teaches the use of only siloxane or silazane with oxygen. This limits the highest coating hardness that can be achieved. The use of hydrogen in addition to oxygen and siloxane or silazane precursors is novel in the present invention and allows achieving higher hardnesses. Petrmichl et al does not indicate the nature of bonding between the C, H, Si and O in the material. It is well known to one skilled in the art of materials science and engineering that the bonding between these coatings influences the properties of the material.

Lin et al[1]. have reported on depositing $SiO_2$-like films using siloxane and oxygen as precursor materials by high-density microwave electron cyclotron resonance discharge. The resulting coating material is different from the present invention and consists mainly of a silicon dioxide. Fourier Transform Infrared Spectroscopy (FTIR) indicates presence of a $SiO_2$-like band (towards higher wavenumbers and sharper Si—O stretching) and small amount of Si—$CH_3$ bonding. The high-density plasma approach utilized by Lin et al is probably responsible for the different type of bonding, different material density (presence of micropores) and higher concentration of oxygen observed in the films. Even though Lin et al have not reported the barrier properties, a microporous coating is expected to have poor barrier properties. The hardness range of this material is unknown.

Dorfman et al (U.S Pat. Nos. 5,466,431 and 5,352,493) describe a diamond-like coating consisting of C, H, Si and O. The optical transparency of the coatings of Dorfinan et al. in the UV-visible range is limited and is highly dependent on coating thickness. Thus, the coatings of Dorfman et al do not have the same degree of transparency as the coatings of the present invention.

Thus, there is a need in the industry for a coating for plastic substrates, and more particularly for flat panel displays which can be deposited on the plastic substrate by a low temperature process at a high deposition rate; and which is cost effective and benign to the environment; and which produces a coated product that is hard, optically transparent, impermeable, scratch and abrasion resistant and that have good adhesion.

SUMMARY OF THE INVENTION

The present invention pertains to a unique hard coating that can provide the necessary characteristics for flat panel plastic substrates. The coating is amorphous and is comprised of C, H, Si and O. The coating of the present invention is hard, optically transparent, scratch and abrasion resistant and is deposited by a low density, low temperature plasma enhanced chemical vapor deposition (PECVD) process. The coating of the present invention is deposited at low temperatures (below 70° C.) and has been successfully deposited on clear plastics such as polycarbonates, polyethylene terephthalates (PET), polyethylene, fluoropolymers and olefins.

In addition to the above advantages, the coating of the present invention exhibits excellent barrier protection. The coating can be pore-free and exhibit reduced permeability to moisture, oxygen, helium and other vapors. The coating is hydrophobic (repels water and prevents wetting) which results in improved barrier protection.

It is a present object of this invention to provide a coating for plastic substrates that has properties which can be tailored.

It is another object of the present invention to provide a coating for plastic substrates that can be deposited below 70° C., thereby making it possible to compatibly coat a variety of flexible substrate materials.

It is a further object of the present invention to provide a coating for plastic substrates which has excellent adhesion, high hardness, excellent transparency in the visible and infrared wavelengths, low film stress, very high resistivity, high degree of flexibility, UV resistance, good chemical resistance, high degree of environmental stability, low surface energy and high water contact angle.

It is yet another object of the present invention to provide a coating for plastic substrates that is impermeable to moisture and corrosive gases, thereby providing a protective barrier for internal circuitry.

BRIEF DESCRIPTION OF THE DRAWINGS

FIG. 1 is a schematic of a hardcoating deposition chamber.

FIG. 2 is a comparison of hardness of the coating with uncoated polycarbonate, bare glass and polysiloxane dip coated polycarbonate.

FIG. 3 is a typical UV-Vis transmission and reflectance spectra for a coating on glass.

DETAILED DESCRIPTION OF THE INVENTION

The present invention pertains to using a transparent, hard, wear-resistant carbon, hydrogen-containing coating on transparent plastic substrates for flat panel displays. However, one particularly preferred embodiment of the coating of the present invention comprises carbon, hydrogen, silicon and oxygen in an amorphous structure. The term "amorphous" used herein refers to a random structure or arrangement of atoms in a solid state that results in no long range regular ordering, and no crystallinity or granularity.

Therefore, the preferred materials used to coat flexible substrates, as described herein, may comprise predominantly a glass-like Si—O network; or a multi component structure comprising Si—O, C—H, Si—H and Si—C. In the latter, Si—O and C—H are predominant with other components being the minority.

The carbon content in the preferred diamond-like coatings of the present is greater than about 25 atomic percent of the coating, preferably from about 25 atomic percent of the coating to about 65 atomic percent of the coating. Although such coatings may theoretically be prepared without any hydrogen, the hydrogen content is preferably at least about 1 atomic percent of the coating up to about 40 atomic percent of the coating. The silicon content ranges from about 10 atomic percent of the coating to about 30 atomic percent of the coating, while the oxygen content ranges from about 8 atomic percent of the coating to about 40 atomic percent of the coating. The density of the coating varies from about 1.7 gm/cc to about 2.0 gm/cc.

The preferred coatings of the present invention are hard carbon, silicon-containing coatings synthesized via a RF discharge plasma process which as a general process would be readily understood by one skilled in the field of thin film deposition. Carbon and silicon-containing radicals can be produced by a plasma discharge and deposited on a substrate applied with a high-voltage field in a vacuum chamber.

FIG. 1 shows one preferred embodiment of the coating chamber used for depositing the preferred hard coatings. A vacuum deposition chamber 100 is provided to coat a substrate sample. A precursor inlet system 110, comprises a metal tube and a gas distribution ring through which a liquid precursor, preferably a low vapor pressure siloxane, is injected. The precursor inlet system 110 is shown incorporated into the chamber 100 through the sidewall of the chamber. An alternate arrangement is introduction of the precursor into the chamber 100 through the top of the chamber 115 via a gas showerhead. The samples are loaded into the chamber from the top of the chamber 115 or through a load lock (not shown). The chamber comprises a cylindrical enclosure with top and bottom parallel 117. A power supply is used for biasing the electrodes (RF-13.56 MHz). In practice, the system is "pumped down" using conventional vacuum pumpdown procedures. Gate valves and foreline valves (not shown) are closed and the system is backfilled with dry nitrogen or argon until the chamber reaches atmospheric pressure. The top of the chamber is then opened and substrates 150 to be coated are placed on the electrodes using any fixtures or fastening means including clips, screws, clamps, tape etc.

The precursor is introduced into the deposition chamber by liquid-to-vapor delivery system. The liquid-to-vapor delivery system is a conventional off-the-shelf component known in the field of vacuum technology. The precursor is stored in a reservoir and is delivered to a flash evaporator, if required. The precursor is flash evaporated into a vapor. A mass flow controller is used to precisely control the flow rate of the precursor liquid through capillary tubing. While not required, a mixing gas, such as argon can be used to assist precursor evaporation.

The high vacuum is achieved by roughing down the chamber with a mechanical pump followed by pumping with a roots blower pump. Other pumping systems, with or without traps, such as turbomolecular pump, cryogenic pump, or other high vacuum pumps known in the field of vacuum technology can also be used. The coatings required according to the process of the present invention can be carried out in a batch type process for small volumes. In such instance, the substrates are mounted on a substrate holder inside the deposition chamber, the chamber is evacuated, the deposition is performed, and the chamber is vented, followed by removal of the coated parts (substrates).

For larger volumes, the process of the present invention can be carried out in a roll-to-roll system. Such a roll-to-roll system could consist of cleaning module, transport mechanism to wind and unwind rolls, and mechanized/robotic loading of the parts into the system. It is understood that the substrates to be coated may be rotated, tilted, or otherwise oriented, or manipulated while on the substrate holder, and at other instances during processing.

Vertical orientation of the substrate is preferred to minimize particulate or debris accumulation and contamination of substrate surfaces. The deposition chambers are evacuated with low turbulence vacuum pumping to minimize particulate and debris being deposited on the substrate surfaces.

The chamber is evacuated to a base pressure below 10 to 20 mTorr after loading the substrates. During deposition the chamber pressure is in the range of 50 to 500 mTorr. The chamber pressure is increased by introduction of the precursor and additional gases such as argon, hydrogen and/or oxygen. A throttling valve could also be used to adjust the chamber pressure. The substrates are ion cleaned inside the deposition chamber before coating.

Substrate plasma cleaning can be performed with a number of gases, such as argon, oxygen and hydrogen. The choice of the gas during plasma cleaning depends on the type of substrate. Substrate plasma cleaning is performed by RF glow discharge. Cleaning gas is introduced until the chamber pressure is in the 50 to 500 mTorr range. Powering the electrode(s) with a RF potential excites a glow discharge. During the discharge, a substrate bias of from about 0.005 to about 5.0 kV can be used. The frequency of the RF is fixed. However, other frequencies (100 KHz to 100 MHz) can also be used. Other ion sources known in the field of deposition coating such as, Kaufnann type ion sources, RF coil, ECR sources etc. can also be used for ion generation. The plasma cleaning process has been found to efficiently remove hydrocarbon contamination, and other contaminants, as well as improve the adhesion of coatings deposited on substrates.

Towards the end of the substrate cleaning, vaporized organosilicon precursors, preferably siloxanes which contain C, H, Si, and O are introduced into the chamber. The precursor can be introduced into the system using liquid-to-vapor delivery systems consisting of flow controller, a heater, and a dispenser as known in the field. The precursors preferably have 1 to 10 silicon atoms. The preferred precursor is HMDSO and is transported to the chamber using a carrier gas such as argon. Along with the precursor, additional gases such as hydrogen and oxygen are introduced. Other gases such as methane, acetylene, butane, $CF_4$, $C_2F_6$ can be used for altering film properties. The RF plasma discharge causes fragmentation and ionization of the precursor.

Variations of the above described deposition process include: (a) the use of sputtered silicon and oxygen gas as sources for Si and O; (b) use of solid $SiO_2$ as a source for Si and O; (c) use of $SiH_4$ and oxygen-containing gases as sources for Si; (d) use of a graphite target, hydrogen, and hydrocarbon gases as sources of C and H. Combination of the aforementioned methods may be used. The coating deposition preferably is sustained by a RF capacitively coupled discharge (CCD).

A single plate configuration can be used. The substrates are attached to the plate. RF or PDC voltage is then applied. In the case of a capacitive RF discharge, the frequency of the RF is in the range of 100 kHz to 100 Mhz. In another method, a large RF antenna can be placed inside the chamber to excite the discharge. The antenna can be made of copper, stainless steel, or other known state of the art materials. A protective coating, such as porcelain, can be applied to the surface of the antenna to prevent sputtering.

A RF potential is generally applied to the substrates during the deposition process. The RF potential assists in densification and hardening of the deposited coating. The range of RF potential is about 0.005 to 5 KV can be altered to tailor the coating properties. No external substrate heating is used. There is generation of heat due to ion bombardment and this causes substrate heating up to 70° C. The substrate holder can be actively cooled using closed circuit heat exchanger, if desired.

The ability to tailor the coating properties and the ability to deposit these coatings below 70° C., makes it possible to compatibly coat a variety of flexible substrate materials such as Polycarbonate, PET, PE, Kapton, Mylar, Ultem and Torlon. It is believed that this "tunability" and lack of thermal mismatch problems contribute to the coatings' excellent adhesion and low stress.

In addition to excellent adhesion, the coatings of the present invention have high hardness, excellent transparency in the visible and infrared wavelengths, low film stress, very high resistivity, high degree of flexibility, UV resistance, good chemical resistance, high degree of environmental stability, low surface energy and high water contact angle.

The coatings have high hardness and elastic modulus as measured by nanoindentation using a Nanoindenter IIs. Because of the high hardness the coating have good scratch resistance and endurance. The coatings exhibit hardness in the range of 2 to 10 GPa (typical-5 to 7.5 GPa). For comparison, the hardness of mild steel is about 3 to 4 GPa and that of glass is about 6 to 8 GPa (FIG. 2). Thus the typical hard coatings are harder than mild steel and are as hard as glass. The typical elastic modulus of hardcoats is in the range of 30 to 50 GPa. The abrasion resistance of the coating was tested by rubbing steel wool 6 to 8 times on a coated polycarbonate substrate. The coating passed the steel wool abrasion test successfully. The optical properties of the coating were not compromised and there was no physical damage to the coating from the steel wool.

The coatings have excellent transmission in the visible wavelengths. The coating transmission exceeds 85% in the wavelength range of 360 to 900 nm. The coating transmission exceeds 90% in the wavelength range of 400 to 900 nm (FIG. 3). The coating transmission is very high in the infrared range as well. The refractive index of the coatings can be tailored in the range of 1.6 to 2.5 at 540 nm wavelength.

The coatings exhibit very low film stress. The residual stress in the coatings has been characterized by laser beam deflection technique using the Stoney equation as known in the state of the art. The residual stress is compressive and is in the range of 90 to 400 MPa. The reason for low stress in the film is credited to the low temperature deposition process and the unique film structure.

The coatings have resistivity exceeding 10e+13 to 10e+14 ohm-cm at room temperature. The coatings also have very high dielectric strength and low leakage current density. The dielectric strength of the coatings is greater than 1 MV/cm and the dielectric constant is around 3.5 to 5.0.

Flexibility of the coatings has been quantified by measuring the lowest radius of curvature to which coated polyimides (Kapton® and Mylar®) substrates could be bent to with no cracking or coating delamination. The coatings are resistant to cracking, down to radius of curvature of 7/32". The flexibility of the coatings is beyond the requirements of the flat panel display application. Coatings are more flexible in the convex bending mode as opposed to the concave bending mode because of the compressive stress in the film. The resistance to degradation on prolonged exposure to illumination of the coatings has been investigated. The coatings were subjected to tungsten lamp illumination (equivalent to 0.5 sun) for about 1500 hours. The coatings showed no change in the optical and physical properties indicating that the coatings are extremely stable.

Good resistance to all of the chemicals associated with FPD fabrication is an essential property for the plastic hardcoat. The coatings have been tested in accordance with ASTM D 1308 for resistance to methanol, acetone, IPA, 30% hydrogen peroxide, and 30% ammonium hydroxide. In all cases, the coating showed no sign of discoloration, blistering, loss of adhesion, or change in the optical characteristics. The coatings have been tested for corrosion resistance and chemical inertness in acidic and alkaline environments. The coatings are not affected by acids such as HCl, HF and $HNO_3$, bases such as KOH.

In order to withstand the high temperatures required in the fabrication of FPDs, it is essential that the hard coat, as well as the substrate, be able to withstand 200° C. for at least 1 hour without degradation of its physical or optical properties. Thermal stability studies performed on these coatings suggest that they can survive temperatures up to 400° C. for 2 hours in an oxidizing environment. This is well above the requirements for the FPD application.

Another requirement of hardcoats for plastic displays is barrier protection from humidity. The coatings have to be impermeable to moisture and corrosive gases so that the permeation through the underlying plastic substrate is prevented and thus protecting the internal circuitry of the product. The coatings act as an excellent barrier to oxygen and water vapor. Coatings have shown reduction in oxygen transmission rate from 1.9 to 80.2 times that of the uncoated polymeric substrates. Coatings have shown reduction in water vapor transmission rate from 1.4 to 12.1 times that of the uncoated polymeric substrates. The effective barrier protection is dependent on the choice of the polymeric substrate.

One of the key aspects of barrier coatings is their affinity to water. The present coatings are highly hydrophobic (prevent water from spreading due to low surface energy) and exhibit a high water contact angle. The higher the contact angle (lower the surface energy), the lower the wetting of the coated surface by water. The coatings have a surface energy of 27 to 38 dyn/cm and a water contact angle of 70 to 92.

The film thickness can range in thickness from 50Å to 10 micrometers.

The following examples serve only to further illustrate aspects of the present invention and should not be construed as limiting the invention.

EXAMPLE 1

Cleaned four by four inch square substrates of Polyethylene and Fluoropolymer were mounted on the bottom electrode. Control samples of silicon, glass, carbon steel, and stainless steel substrates that were cleaned in a detergent, followed by Isopropanol and then blow dried with Nitrogen gas were also mounted on the substrate holder. The chamber was evacuated to an ultimate pressure of 25 mtorr. Argon gas was introduced in to the chamber to raise the pressure to 180 mtorr. An RF substrate power of 300 W was used to bias the substrates for in-situ plasma cleaning. The substrates were plasma cleaned for 5 minutes. After cleaning the substrate power was ramped up to 500 W which corresponded to a substrate bias of 150 V. Then the precursor was introduced through the liquid vapor delivery system. The precursor Hexamethyldisiloxane (HMDSO) was used in this deposition. A precursor flow rate of 0.06 g/min was used. Additional process gases such as hydrogen and oxygen were introduced simultaneously. The hydrogen flow rate was 30 sccm and the oxygen flow rate was 33.5 sccm. The deposition was performed under the above conditions for 45 minutes. The substrate holder temperature after the deposition was about 55° C. This resulted in a 0.85 micrometer thick, highly adherent coating. The coating exhibited a hardness of 7 GPa and an elastic modulus of 62 GPa on carbon steel substrates as measured by nanoindentation using the Nanoindenter IIs. The coating was clear and exhibited 91.6% transmission at 540 nm. The coating exhibited a refractive index of 1.86 at 540 nm wavelength.

EXAMPLE 2

The coated substrates from Example 1 were tested for adhesion by Scotch Tape Adhesion test. The substrates tested were Fluoropolymer, polycarbonate, glass, silicon and carbon steel substrates were tested. The adhesion was good on all substrates and no coating delamination or debonding was observed.

EXAMPLE 3

Cleaned four by four inch square substrates of Polyethylene, Cyclic Polyolefin and Fluoropolymer were mounted on the bottom electrode. Control samples of silicon, glass, carbon steel, and stainless steel substrates that were cleaned in a detergent, followed by Isopropanol and then blow dried with Nitrogen gas were also mounted on the substrate holder. The chamber was evacuated to an ultimate pressure of 25 mtorr. Argon gas was introduced in to the chamber to raise the pressure to 180 mtorr. A RF substrate power of 300 W was used to bias the substrates for in-situ plasma cleaning. The substrates were plasma cleaned for 5 minutes. After cleaning the substrate power was ramped up to 538W which corresponded to a substrate bias of 162 V. Then the precursor was introduced through the liquid vapor delivery system. The precursor HNDSO was used in this deposition. A precursor flow rate of 0.06 g/min was used. Additional process gases such as hydrogen and oxygen were introduced simultaneously. The hydrogen flow rate was 30 sccm and the oxygen flow rate was 45.6 sccm. The deposition was performed under the above conditions for 38 minutes. The substrate holder temperature after the deposition was about 50° C. This resulted in a 0.73 micrometer thick, highly adherent coating. The coating exhibited a hardness of 6.2 GPa on carbon steel substrates as measured by nanoindentation using the Nanoindenter IIs. The coating was clear and exhibited 81.2% transmission at 400 nm and 90.3% transmission at 540 nm. The coating exhibited a refractive index of 1.76 at 540 nm wavelength. The barrier properties of the coatings on the fluoropolymer and the polyethylene were measured by MOCON (Minneapolis, MN) tests using ASTM, DIN and JIS methods. The oxygen transmission rates reduced from 1.9 to 80.2 times that of the uncoated substrates. The water vapor transmission rates reduced from 1.4 to 12.1 times that of the uncoated substrates.

EXAMPLE 4

Cleaned four inch long ¼" OD Tygon® tubing was mounted on the bottom electrode. The tubing was mounted on two end posts so that the length of the tube was elevated and not in contact with the bottom electrode. Control samples of silicon, glass, carbon steel, and stainless steel substrates that were cleaned in a detergent, followed by Isopropanol and then blow dried with Nitrogen gas were also mounted on the substrate holder. The chamber was evacuated to an ultimate pressure of 25 mtorr. Argon gas was introduced in to the chamber to raise the pressure to 180 mtorr. An RF substrate power of 300W was used to bias the substrates for in-situ plasma cleaning. The substrates were plasma cleaned for 5 minutes. After cleaning the substrate power was ramped up to 538W which corresponded to a substrate bias of 162 V. Then the precursor was introduced through the liquid vapor delivery system. The precursor HMDSO was used in this deposition. A precursor flow rate of 0.06 g/min was used. Additional process gases such as hydrogen and oxygen were introduced simultaneously. The hydrogen flow rate was 30 sccm and the oxygen flow rate was 45.6 sccm. The deposition was performed under the above conditions for 38 minutes. The substrate holder temperature after the deposition was about 50° C. This resulted in a 0.73 micrometer thick, highly adherent coating on a flat control substrate. The coating exhibited a hardness of 6.2 GPa on carbon steel substrates as measured by nanoindentation using the Nanoindenter IIs. The coating was clear and exhibited 81.2% transmission at 400 nm and 90.3% transmission at 540 nm. The coating exhibited a strong Si—O stretching band at 1020 cm$^{-1}$ wavenumber, a Si—H band at around 780 cm$^{-1}$ and a C—H band around 2900 cm$^{-1}$.

We claim:

1. An abrasive resistant, transparent barrier coating for plastic substrates comprised of carbon, hydrogen, silicon and oxygen in an amorphous structure wherein said coating is deposited at a temperature of or below about 70° C. and at a pressure in the range of from about 50 mTorr to about 500 mTorr and further said coating having the properties of Nanoindentation hardness in the range of about 2 to about 10 GPa.

2. The coating of claim 1 comprised of a glass-like Si—O network.

3. The coating of claim 1 comprised of a multi component structure comprising Si—O, C—H, Si—H and Si—C.

4. The coating of claim 3 wherein Si—O and C—H are predominant.

5. The coating of claim 1 wherein the carbon content is greater than about 25 atomic percent of the coating.

6. The coating of claim 1 wherein the carbon content is from about 25 atomic percent of the coating to about 65 atomic percent of the coating, the hydrogen content is at least about 1 atomic percent of the coating up to about 40 atomic percent of the coating, the silicon content is from about 10 atomic percent of the coating to about 30 atomic percent of the coating and the oxygen content ranges from about 8 atomic percent of the coating to about 40 atomic percent of the coating.

7. The coating of claim 1 wherein the density of the coating varies from about 1.7 gm/cc to about 2.0 gm/cc.

8. The coating of claim 1 wherein said coating is synthesized via a RF discharge plasma process.

9. The coating of claim 1 wherein said coating is deposited by a low density, low temperature plasma enhanced chemical vapor deposition process.

10. The coating of claim 1 wherein the coating has the properties of Nanoindentation hardness in the range of about 5 to about 7.5 GPa.

11. The coating of claim 1 wherein the coating has a UV transmission greater than 85% in the wavelength range of frog about 360 to about 900 nm.

12. The coating of claim 1 wherein the coating has a UV transmission greater than 90% in the wavelength range of frown about 400 to about 900 nm.

13. The coating of claim 1 wherein the coating has a surface energy of from about 27 to about 38 dyn/cm.

14. The coating of claim 1 wherein the coating has a water contact angle of from about 70 to about 90.

15. The coating of claim 1 wherein the coating has a film thickness from about 50 angstroms to about 10 micrometers.

16. The coating of claim 1 herein the coating is hydrophobic.

17. The coating of claim 1 wherein the coating is impermeable.

* * * * *